(12) United States Patent
Ma

(10) Patent No.: US 10,321,104 B2
(45) Date of Patent: Jun. 11, 2019

(54) MULTI-MODAL PROJECTION DISPLAY

(71) Applicant: Samsung Electronics Co., Ltd., Suwon-si, Gyeonggi-do (KR)

(72) Inventor: Tao Ma, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/353,578

(22) Filed: Nov. 16, 2016

(65) Prior Publication Data

US 2017/0244942 A1 Aug. 24, 2017

Related U.S. Application Data

(60) Provisional application No. 62/297,076, filed on Feb. 18, 2016.

(51) Int. Cl.
| | |
|---|---|
| *H04N 9/31* | (2006.01) |
| *H04N 7/18* | (2006.01) |
| *G06F 3/01* | (2006.01) |
| *B25J 11/00* | (2006.01) |
| *G03B 21/00* | (2006.01) |
| *G03B 21/10* | (2006.01) |
| *G03B 21/14* | (2006.01) |

(Continued)

(52) U.S. Cl.
CPC ........ *H04N 9/3152* (2013.01); *B25J 11/0015* (2013.01); *G03B 21/00* (2013.01); *G03B 21/10* (2013.01); *G03B 21/145* (2013.01); *G03B 21/28* (2013.01); *G06F 3/011* (2013.01); *G06F 3/013* (2013.01); *G06F 3/0304* (2013.01); *H04N 7/18* (2013.01); *H04N 7/183* (2013.01); *H04N 9/3141* (2013.01); *H04N 9/3147* (2013.01); *H04N 9/3185* (2013.01); *H04N 9/3194* (2013.01); *G06F 3/167* (2013.01)

(58) Field of Classification Search
CPC .. H04N 9/3152; H04N 9/3135; H04N 9/3185; H04N 9/3194
USPC ....... 345/419, 173, 661; 349/13; 353/72, 28, 353/79, 70; 348/745
See application file for complete search history.

(56) References Cited

U.S. PATENT DOCUMENTS

| | | | | |
|---|---|---|---|---|
| 7,134,756 | B2 * | 11/2006 | Drucker ................. | G03B 21/28 353/77 |
| 8,042,949 | B2 * | 10/2011 | Taylor ................... | G06F 3/0421 345/173 |

(Continued)

FOREIGN PATENT DOCUMENTS

| | | |
|---|---|---|
| CN | 102707557 A | 10/2012 |
| DE | 10357726 B3 | 8/2005 |

(Continued)

*Primary Examiner* — Michael E Teitelbaum
*Assistant Examiner* — Sean N. Haiem
(74) *Attorney, Agent, or Firm* — Innovation Counsel LLP

(57) ABSTRACT

A multi-modal display device is presented. The display device has a shell having an internal projection screen and an opening, a projector emitting a projection beam from inside the shell. There is an optical guide adjusting a position of the projector to aim the projection beam at either the internal projection screen or the opening. A processor coupled to the optical guide may select a display position, wherein different display positions are associated with different display area sizes. The method includes determining a distance between a projector and a user, and automatically selecting a display mode based on the distance.

14 Claims, 19 Drawing Sheets

(51) Int. Cl.
*G03B 21/28* (2006.01)
*G06F 3/03* (2006.01)
*G06F 3/16* (2006.01)

(56) References Cited

U.S. PATENT DOCUMENTS

| | | | | |
|---|---|---|---|---|
| 8,427,511 | B2* | 4/2013 | Shin | G06F 1/1639 |
| | | | | 345/1.1 |
| 9,218,027 | B2* | 12/2015 | Miyashita | G06F 1/1626 |
| 2001/0046034 | A1* | 11/2001 | Gold | G03B 21/005 |
| | | | | 353/72 |
| 2002/0113912 | A1* | 8/2002 | Wright | G03B 13/04 |
| | | | | 349/13 |
| 2008/0259289 | A1* | 10/2008 | Nozaki | G03B 17/00 |
| | | | | 353/70 |
| 2012/0092337 | A1* | 4/2012 | Tsao | G02B 27/2214 |
| | | | | 345/419 |
| 2016/0003636 | A1* | 1/2016 | Ng-Thow-Hing | H04N 7/188 |
| | | | | 701/26 |
| 2016/0292921 | A1* | 10/2016 | Evans | G06T 19/20 |
| 2016/0364007 | A1* | 12/2016 | Kamovich | G06F 3/0488 |
| 2017/0031530 | A1* | 2/2017 | Ikeda | G03B 17/54 |

FOREIGN PATENT DOCUMENTS

| | | |
|---|---|---|
| DE | 102005049825 A1 | 4/2007 |
| WO | 2010124267 A1 | 10/2010 |

\* cited by examiner

Code Sample

```
void neckSpinClock(float angle, int speedLevel) //command ID: B7
{
    float motor_speed = speed2Level(speedLevel);  //convert speed level to real motor speed
    float motor_time = angle* motor_speed;  //estimate how long the motor spin in millisecond
    float cur3 = servoEaser3.getCurrPos();  //get current motor angle
    servoEaser3.easeTo(cur3 + angle, motor_time);  //send command to make motor spin
    while(servoEaser3.hasArrived() == 0) {  //keep moving till it reaches to the angle
        servoEaser3.update();
        if(servoEaser3.getCurrPos() > spin_motor_limit1)  //stop spinning if hit the limit
            break;
    }
}
```

FIG. 15

MULTI-MODAL PROJECTION DISPLAY

CROSS-REFERENCE TO RELATED APPLICATION(S)

This application claims the benefit of U.S. Provisional Application No. 62/297,076 filed on Feb. 18, 2016, which is incorporated by reference herein.

BACKGROUND

Today, electronic devices are becoming increasingly multi-functional. Often, functions that were once served by two or three separate devices are now combined into a single multi-functional device. For example, while a fax machine, a scanner, and a copier used to require three separate machines that each only performed one function, a single machine today can serve all three purposes. Such multi-functionality minimizes clutter and simplifies life.

One of the areas where it is difficult to consolidate a plurality of devices into a single device is the area of display devices. Generally, a display device has a specific fixed display size and can only display images on that fixed-size display. For example, a digital clock has a small display, and a user has to stand close to the clock to read the visual content. It is difficult to consolidate a large screen function like a television with a small-screen device like a tablet into a single multi-functional device and achieve significant space/size reduction.

A single device that can fulfill both large-screen functions and small-screen function is desired.

SUMMARY

In one aspect, the present disclosure pertains to a device comprising a shell that has an internal projection screen and an opening, and a projector emitting a projection beam from inside the shell. There is an optical guide adjusting a position of the projector to aim the projection beam at one of the internal projection screen and the opening.

In another aspect, the present disclosure pertains to a method that includes emitting, by a projector, a projection beam from inside a shell of an electronic device, and adjusting, by an optical guide, a position of the projector to aim the projection beam at one of an internal projection screen on the shell and an opening of the shell.

BRIEF DESCRIPTION OF THE DRAWINGS

FIG. 15 depicts an exemplary code sample for motion API.

DETAILED DESCRIPTION

A multi-modal display device disclosed herein is configured to project visual content on a large surface or a small screen display. One set of projection system is used to display visual content (e.g., images, video) on different manners to satisfy user's need under various situations. In one embodiment, when a user is close to the device, content is displayed on a small internal screen of the device. When the user is far from the device, content is displayed on a larger external surface via projection, e.g. on a wall, tabletop, or floor. The switch between the small-display mode and the large-display mode may be manual or automatic.

Figure 1:
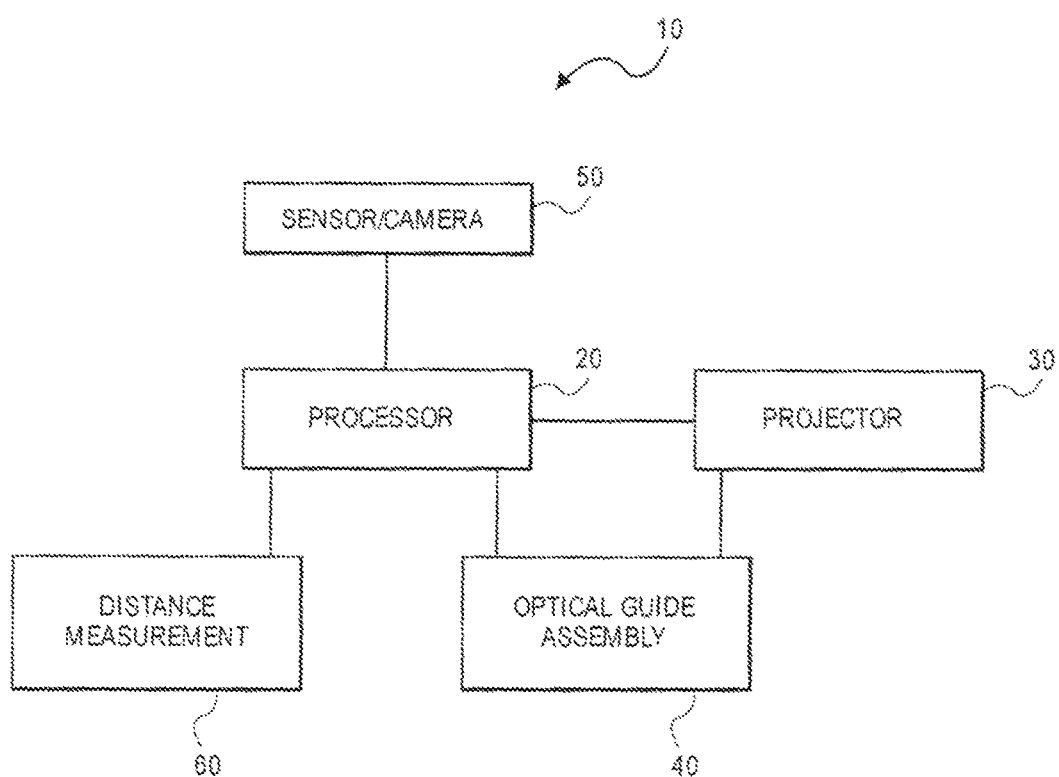
FIG. 1 depicts a multimodal display device according to one embodiment.

FIG. 1 depicts an interactive device 10 according to one embodiment. As shown, the device 10 includes a processor 20, a projector 30, an optical guide assembly 40, a sensor/camera 50, and a distance measurement unit 60 connected to one another. The sensor 50 may be any sensor capable of proximity sensing, including but not limited to a camera, an infrared sensor, or a laser sensor. The optical guide assembly 40 receives instructions from the processor 20 and is able to move the direction of the projection beam generated by the projector 30. The distance measurement unit 60 measures a distance between the device 10 and an external projection surface.

Figure 3:
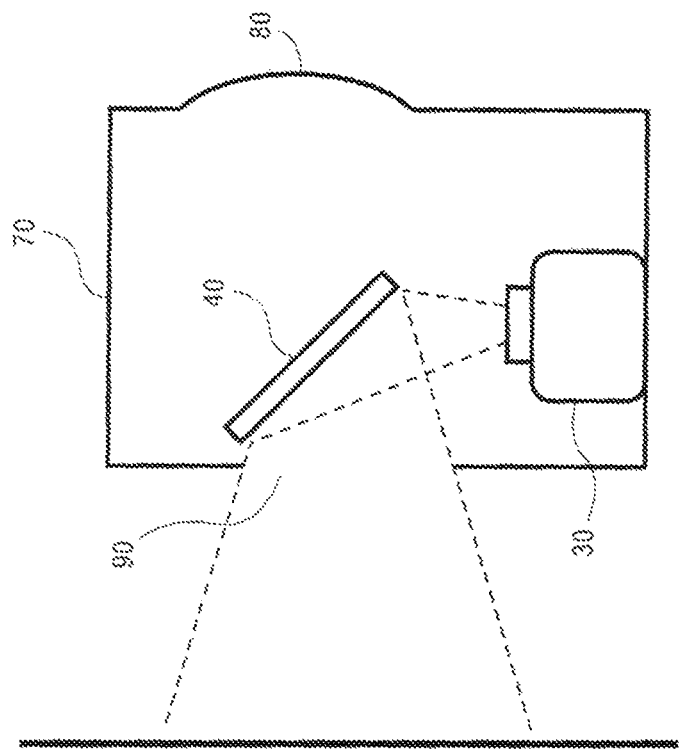
FIG. 3 depicts an exemplary diagram of a multi-modality display device operating in large-screen mode according to one embodiment.
Figure 2:
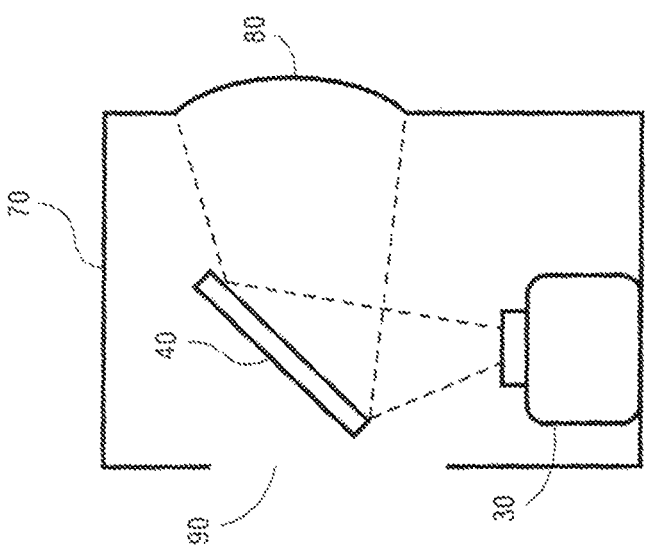
FIG. 2 depicts an exemplary diagram of a multi-modality display device operating in small-screen mode according to one embodiment.

In accordance with one embodiment, the device 10 provides a multi-modality display system to project visual content (e.g., a movie, information, and a UI element) on areas with a different display mode. FIG. 2 and FIG. 3 depict an exemplary diagram of a multi-modality display feature in the device 10 in accordance with one embodiment. The device 10 may include an optical projector 30 that is placed within a shell 70 with the lens of the projector facing up. A curved projector screen 80 may be installed on the internal curved surface of the shell 70. In one embodiment, the head of the device 10 includes a multi-path optical guide assembly 40 that directs light from the projector 30 to either the curved projector screen 80 on the internal curved surface of the shell 70 or a surface (e.g., a wall surface) that is external to the device 10. The shell 70 may include an opening 90 so that the projector can project the visual content on an external surface (e.g., a wall) through the opening 90. In one embodiment, the multi-path optical guide assembly 40 is a rotatable mirror. The optical guide assembly 40 may direct light from the projector 30 to the curved projector screen 80 to display various UI elements, for example, eyes and facial expressions. The optical guide assembly 40 may direct light to a surface external to the device 10 to display visual content such as information and media (e.g., a movie).

According to one embodiment, the device 10 includes one or more sensors (not shown) to determine whether to project visual content on the curved projector screen or to the wall based on various decision factors including but not limited to user distance, a resolution of the visual content, a type of visual content (e.g., a movie), and a specified usage parameter. For example, if the device 10 detects a user who is relatively close based on the user being within a predefined threshold radius, the device 10 displays the visual content on the curved projector screen 80. In another example, if the type of visual content is a movie, the device 10 displays the visual content on a wall that is external to the device 10 through the opening 90. The device 10 may further determine a display mode and a resolution of the projector 30 based on the type of visual content, a proximity to a projection surface, and an optical property of the projector 30.

FIG. 2 depicts the device 10 operating in a small-screen mode according to one embodiment. As shown, the projector 30 and the optical guide assembly 40 are positioned inside an enclosure or the shell 70, such that the projector 30 projects the beam upward and the optical guide assembly 40 receives the beam. The shell 70 has an internal projector screen 80 (which may be flat or curved) and an opening 90. The opening 90 may be a transparent window or an actual cutout that is without a solid material. In this particular embodiment, the optical guide assembly 40 includes a rotatable mirror. Depending on whether the device 10 is operating in a small-screen mode or a large-screen mode, the optical guide assembly 40 reflects the beam in different directions. In FIG. 2, the device 10 is operating in small-screen mode and thus the beam is directed to the internal projector screen 80.

FIG. 3 depicts the device 10 operating in a large-screen mode according to one embodiment. The device 10 depicted in FIG. 3 may be substantially similar to the device of FIG. 2. To operate in large-screen mode, the optical guide assembly 40 directs the projection beam toward the opening 90, projecting the visual content (e.g., a UI, an image, and a video) onto a surface that is external to the shell 70. For example, the visual content may be projected onto a wall or floor. The rotation of the optical guide assembly 40 may be implemented by a set of action mechanism and control circuits. For a smooth display mode transition, the projector may be dimmed when the optical guide assembly 40 is being adjusted (e.g., a mirror is rotating).

Figure 4B:
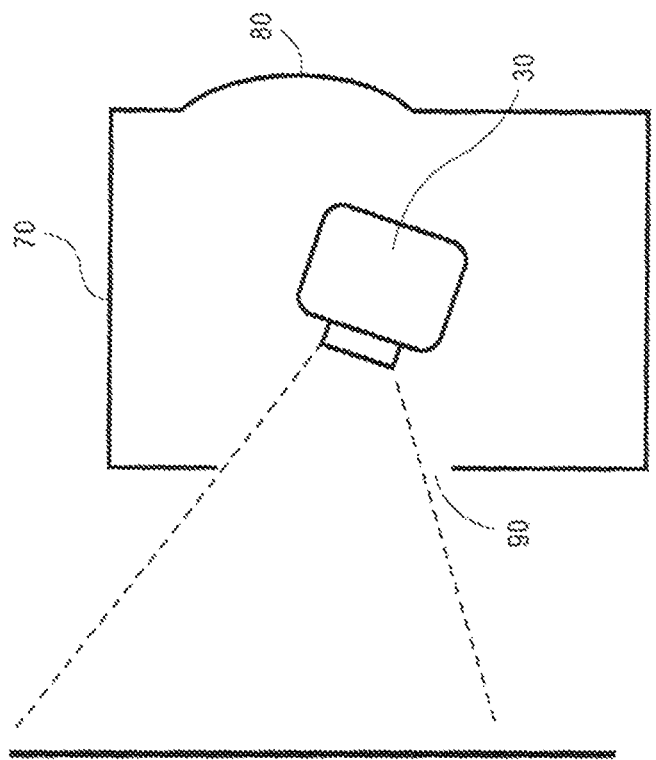
FIG. 4B depicts an exemplary diagram of a multi-modality display device operating in large-screen mode according to another embodiment.
Figure 4A:
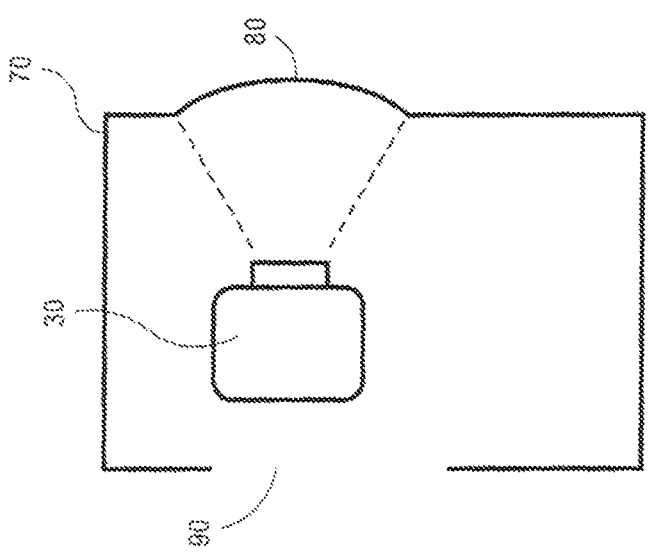
FIG. 4A depicts an exemplary diagram of a multi-modality display device operating in small-screen mode according to another embodiment.

FIG. 4A depicts the device 10 operating in a small-screen mode according to another embodiment. As in the embodiment of FIG. 2 and FIG. 3, the projector 30 is positioned inside the shell 70. In this embodiment, however, the projector 30 does not aim the beam upward. The optical guide assembly 40 includes a moving mechanism for the projector 30 such that the projector 30 can be moved vertically and/or horizontally as well as rotated to adjust the projection beam direction. In the situation depicted in FIG. 4A, the projector 30 is positioned to aim its beam squarely at the internal screen 80, therefore operating in a small-screen mode.

FIG. 4B depicts the device 10 operating in a large-screen mode according to another embodiment. In the embodiment of FIG. 4B, the projector 30 is adjusted so that it directs its projection beam at the opening 90 at an upward angle. As will be explained below in more detail, once the processor 20 determines to operate in a large-screen mode, the processor 20 identifies the projection surface that is external to the shell 70. The position of the projector 30 depends on the location and size of the identified projection surface. For example, if the visual content is intended to be displayed on the floor, the projector would be raised higher in the shell 70 and angled or tilted downward to direct the beam downward through the opening 90. On the other hand, if the visual content is intended to be displayed on the wall, the projector 30 would be positioned lower inside the shell 70 and tilted upward to direct the beam at the appropriate height on the wall.

In one embodiment, the processor 20 determines whether to operate the device 10 in a small-screen mode by aiming the projection beam at the internal screen 80, or to operate the device 10 in a large-screen mode by aiming the projection beam at the opening 90. In making this determination, a number of factors are taken into account; for example, the distance between the user and the device 10, the number of people within proximity, a type of content, and specified usage parameters such as brightness of the environment. If the distance between the user and the device 10 is large, it is likely that the visual content will be shown in large-screen mode because it would be difficult for the user to see the images on a small screen. If the visual content were user interface (UI) images, it is more likely that the visual content will be displayed on the internal screen 80 than if the visual content is a movie or a video. If the amount of light in the environment is high, it is more likely that the visual content will be displayed on the small internal screen 80 because a projection on a wall/floor may be difficult to see.

In one embodiment, the shell 70 is part of a robot companion. In this case, the visual content may be facial expressions or eyes of the robot, or animations. The processor 20 would know that when the visual content is part of the robot, the projection should be made on the internal screen 80.

Figure 5:
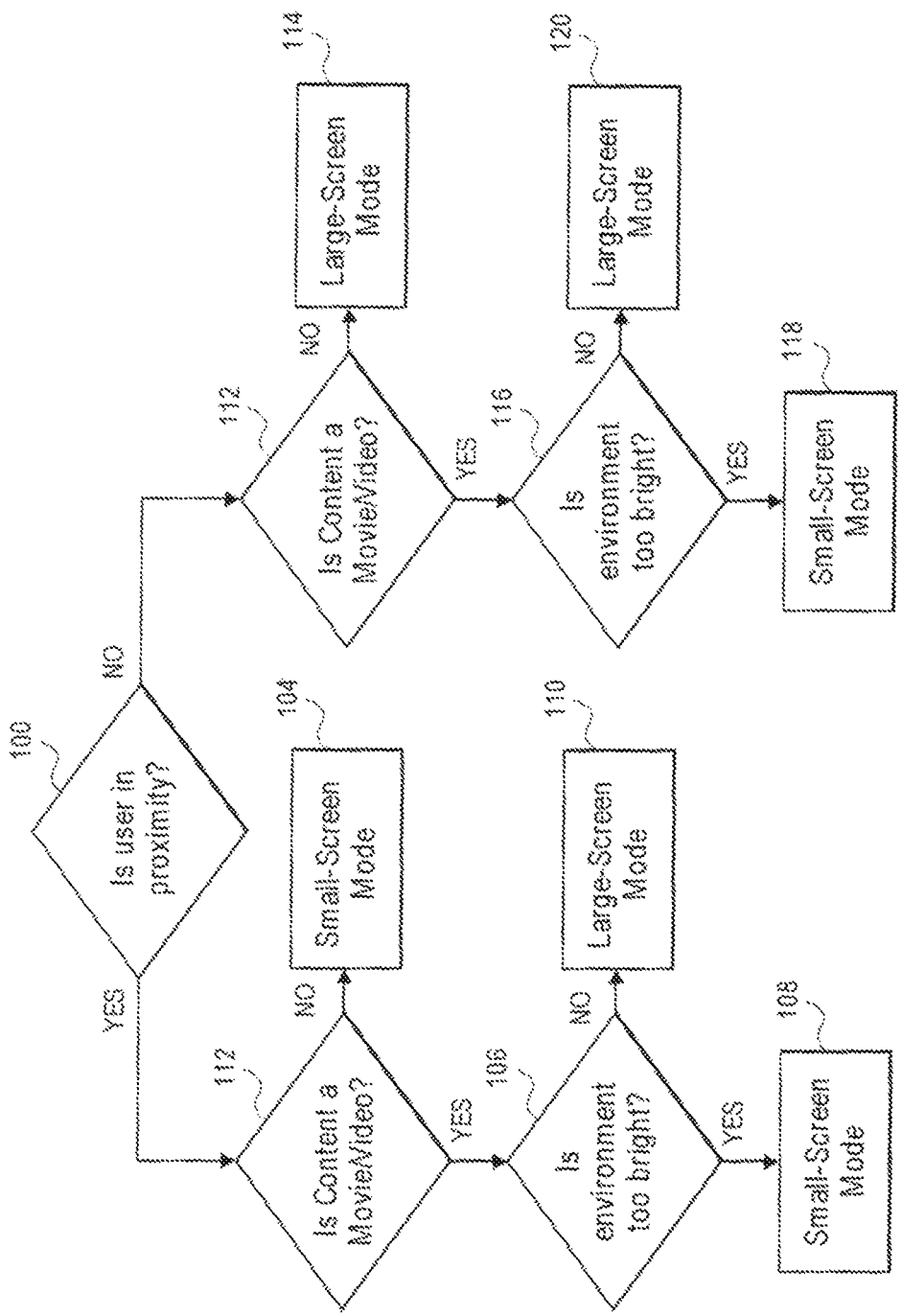
FIG. 5 is a flowchart depicting how the device 10 decides between the two display modes according to one embodiment.

The various factors that are taken into account to decide between a plurality of display modes according to display area size (e.g., a small-screen mode and a large-screen mode) may be implemented using predefined threshold values/range or threshold scopes, or some kind of total-score system. FIG. 5 is a flowchart depicting how the device 10 decides between the two display modes according to one embodiment. In this particular embodiment, the process begins with determining the proximity of the user to the device 10 or the internal projection screen 80 (at 100). If the user is close to the device 10, for example within a predefined distance or satisfies a threshold range from the device 10, the content type is examined (at 102). If the content is a UI content, it is shown on a small screen (e.g., a curved projector screen 80 of the device 10) (at 104) for the user to see it privately or up close and may be interact with the device 10 as necessary. If the content is a movie or a video, a large-screen mode operation would be favorable. However, before a projection is made on an external surface, an amount of ambient light is checked (at 106). The environment being too bright (e.g., if the amount of ambient light satisfies a threshold scope) would cause the processor 20 to switch the mode to small-screen mode (at 108) since a projection would be difficult to see. On the other hand, if the environment is not too bright (e.g., if the amount of ambient light does not satisfy a threshold scope), the visual content would be projected on a large screen (e.g., a surface external of the device 10) (at 110).

If the user were outside the proximity region of the device 10 (at 100) (e.g., a distance between the user and the device 10 does not satisfy the threshold range), the processor may be biased in favor of operating in the large-screen mode. Upon checking the content type (at 112), however, if the content is a UI content, it would be displayed on the small screen (at 118). If, on the other hand, the content is a movie or a video (at 112), it would be projected on a large screen (at 114) regardless of ambient light level. Depending on the content type, it may still be displayed on the large screen (at 120) if the environment is not too bright for a wall/floor projection. The flowchart shown in FIG. 5 is just an example, and not a limitation on the process used by the processor 20 to select the display mode. It is understood that the process steps may be in any order, without deviating from the scope of the present disclosure.

The process of FIG. 5 may be repeated periodically (e.g., at every preset time interval) such that the display mode can be dynamically adjusted in response to the changes in the environment, e.g. as the user moves, room darkens, etc. Depending on the embodiment, the processor 20 may dynamically switch the display mode in the middle of showing a content. For example, even if a user began watching a movie on the small screen because it was too bright when the movie started, the display may automatically switch to wall projection after the room becomes less bright. This is done by the sensor 50 continually (e.g., at a preset time interval) monitoring the ambient light level. Similarly, the sensor 50 may continually monitor the distance between the user and the projector 30 and dynamically switch display modes to suit the distance.

The display mode may be changed manually by a user. In one embodiment, a user can press a button or spin a knob to change the display mode. While the processor 20 uses sensor data and selects a particular display mode, the user may be able to override the processor decision.

When displaying the visual content in large-screen mode, the device 10 may use the distance measurement unit 60 (e.g., a laser tape measure) to determine how far the intended projection surface is from the device 10 and automatically adjust the focal length such that the displayed content will be in focus regardless of where it is projected. The measurement unit 60 may be attached to the projector 30 and move with the projector 30. Where there is an optimal distance range or distance limit between the projector 30 and the projection surface, the device 10 may be able to move itself (e.g., using wheels or rollers attached to the base) to the optimal position to display the image. Furthermore, by using the sensor 50, the device 10 can find a flat, blank surface for the large-screen display mode. This will avoid visual content from being displayed on an artwork or any other surface that would not be suitable.

Figure 6:
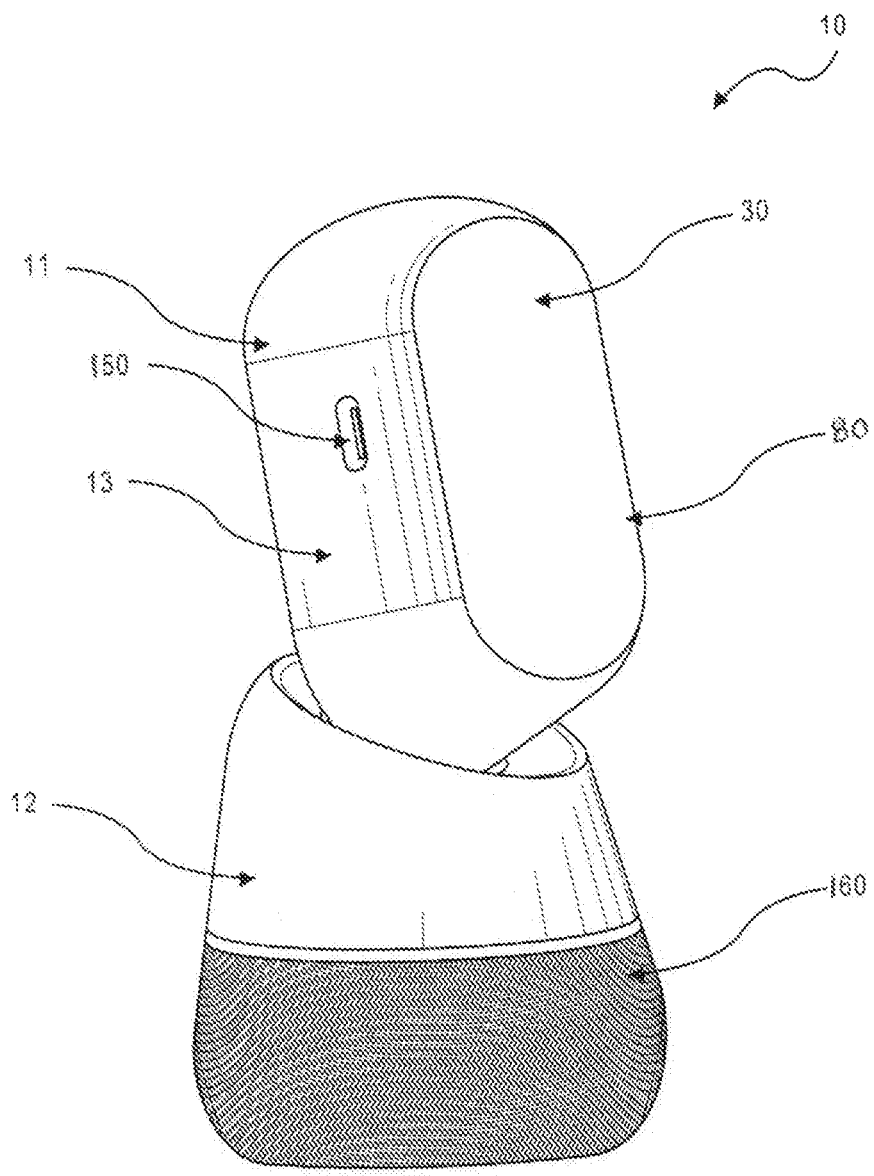
FIG. 6 depicts an exemplary device according to one embodiment.

FIG. 6 depicts an exemplary device 10 in accordance with one embodiment. The device 10 as shown includes a head 11 and a body 12. The head 11 includes a head shell 13 and the internal projector screen 80 that includes a user interface (UI). The sensor 30, which is a camera in this particular embodiment, is positioned behind and on the inside of the internal projector screen 80. The microphone 150 is positioned to the side of the internal projection screen 80 to resemble "ears." In this particular embodiment, the speaker 160 is positioned near the body 12. It should be understood that the components of the interactive device 10 may be arranged differently without deviating from the scope of this disclosure. It should also be understood that while the description focuses on an embodiment of the device 10 that is a robotic companion, this is not a limitation and the device 10 may be any electronic device.

Figure 7A:
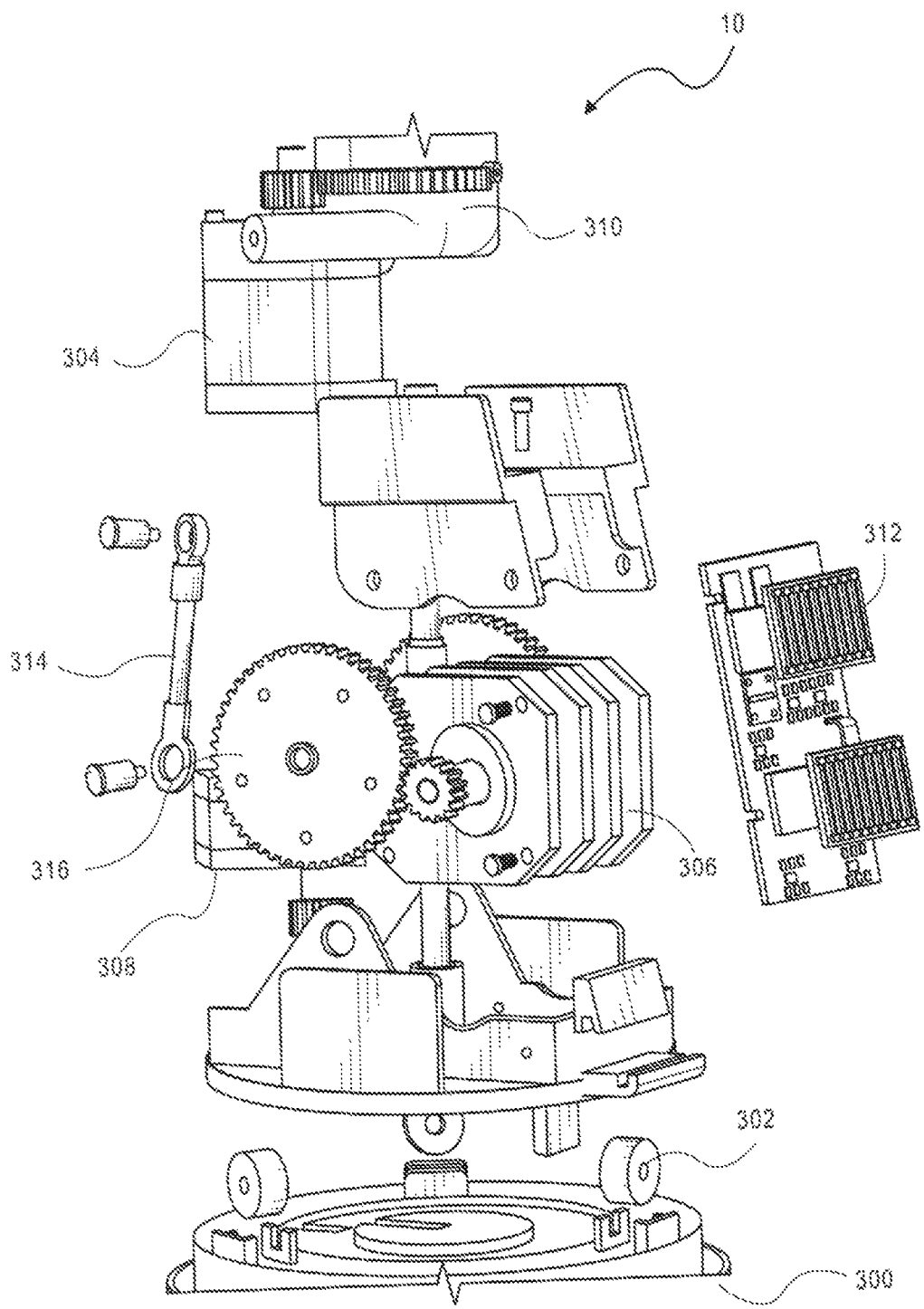
FIG. 7A and FIG. 7B depict an exploded view and a perspective view, respectively, of components within the device in accordance with one embodiment.
Figure 7B:
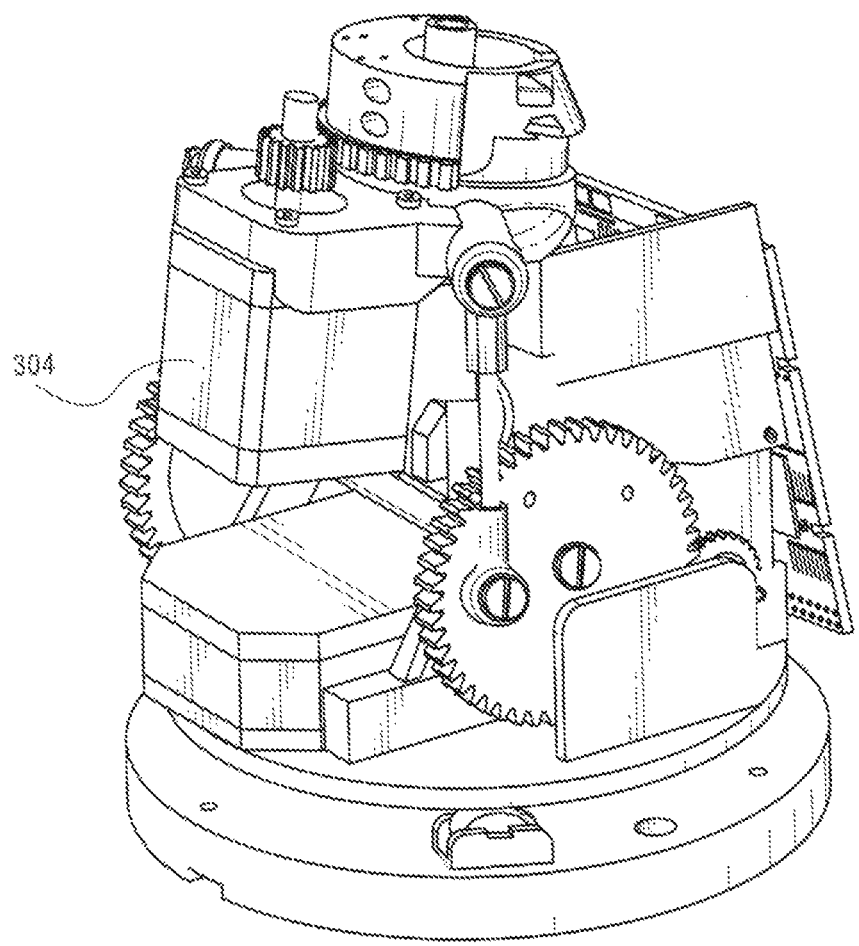

FIG. 7A and FIG. 7B depict an exploded view and a perspective view, respectively, of components within the device 10 in accordance with one embodiment. As shown, the device 10 rests on a base 300 for stability, and has rollers 302 that allow the body 12 to swivel. There are a plurality of stepper motors to enable movement of various parts: a first stepper motor 304 for head rotation, a set of second stepper motors 306 for head tilting, and a third stepper motor 308 for body rotation. A geared neck sub-assembly 310 and a PCB sub-assembly 312 are incorporated into the device 10, as are a head tilt-control arm 314 coupled to the head tilt control gear 316.

Figure 8A:
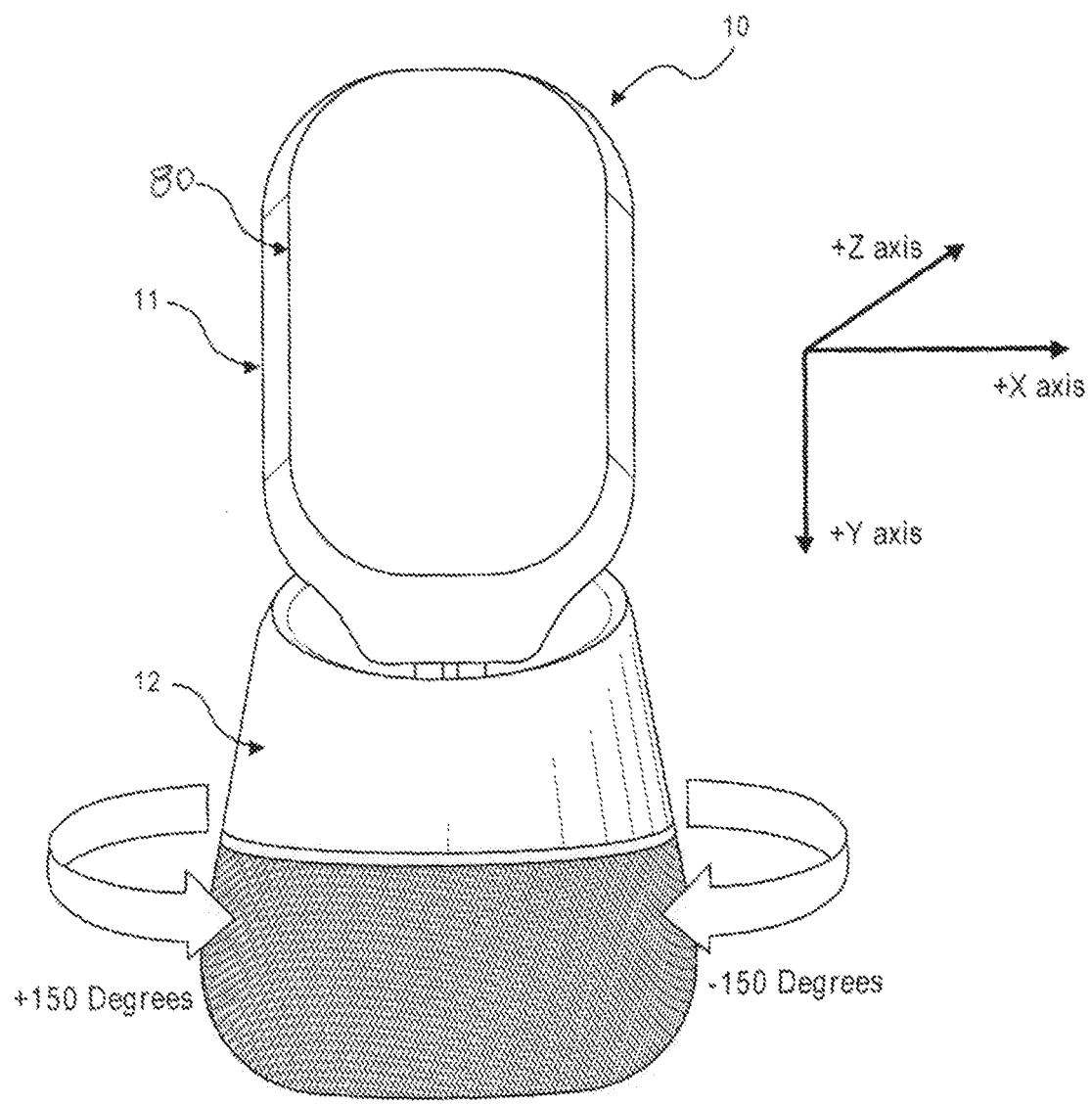
FIG. 8A and FIG. 8B depict a rotation range of the exemplary device according to one embodiment.
Figure 8B:
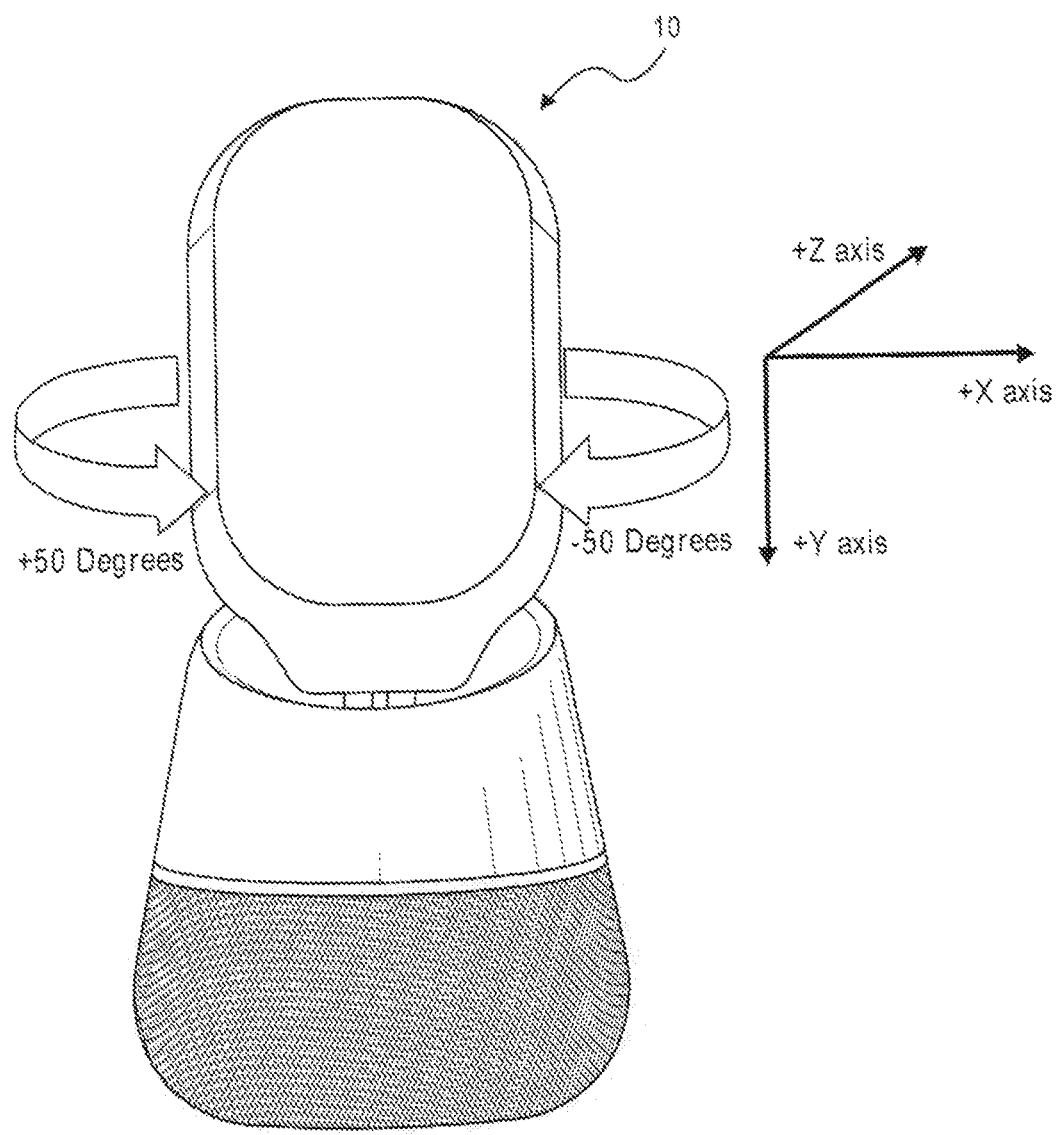

FIG. 8A and FIG. 8B illustrate a rotation range of the exemplary device 10 in accordance with one embodiment. This example embodiment includes a body 12 that is configured to rotate about a y-axis with a total of 300 degrees of movement (+150 degrees to −150 degrees) while the base 300 and the head 11 remain in position. The head 11 and the body 12 can be controlled separately. FIG. 8B illustrates another embodiment in which the head 11 rotates about a y-axis by a total of 100 degrees of movement (+50 degrees to −50 degrees) while the body 12 remains in position. It should be understood that both the body rotation depicted in FIG. 8A and the head rotation depicted in FIG. 8B may be combined into a single embodiment.

Figure 9A:
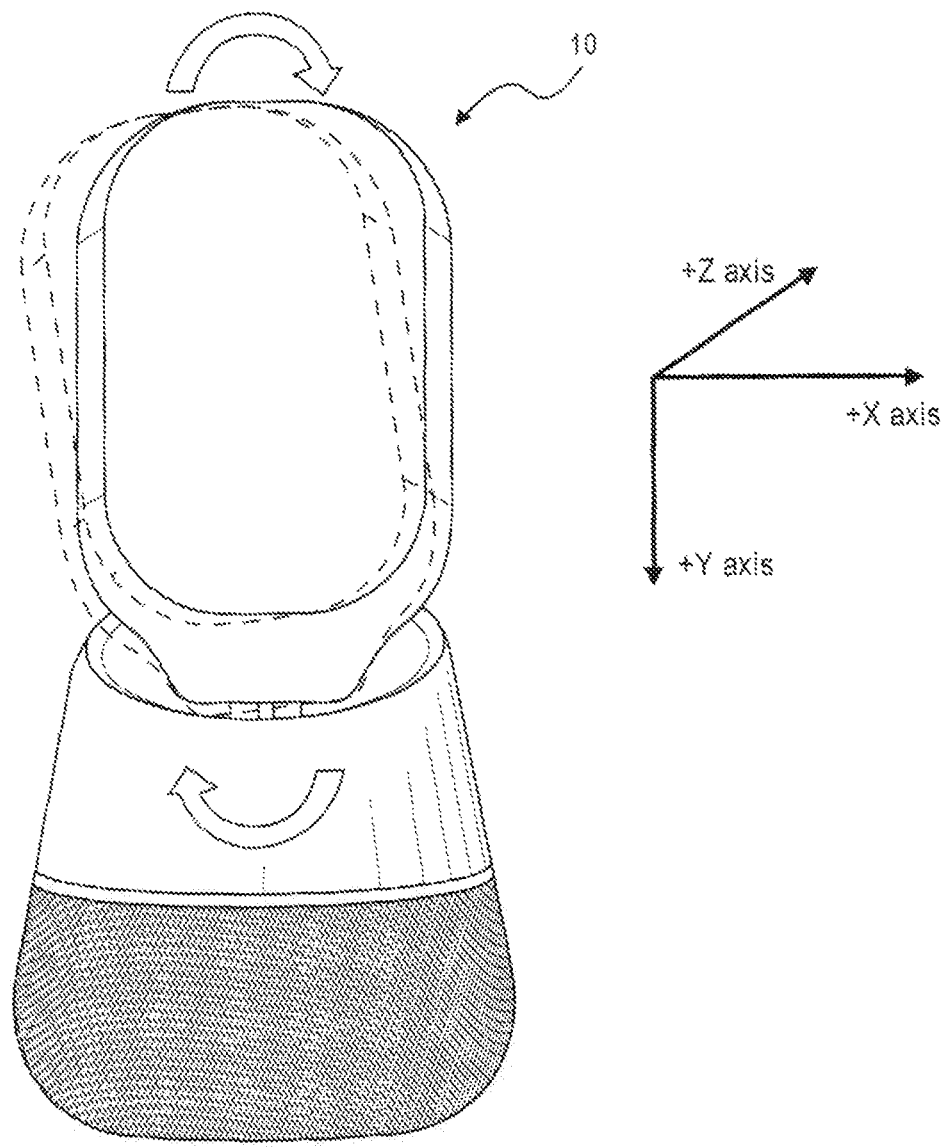
FIG. 9A and FIG. 9B illustrate a rotation range of the device according to another embodiment.
Figure 9B:
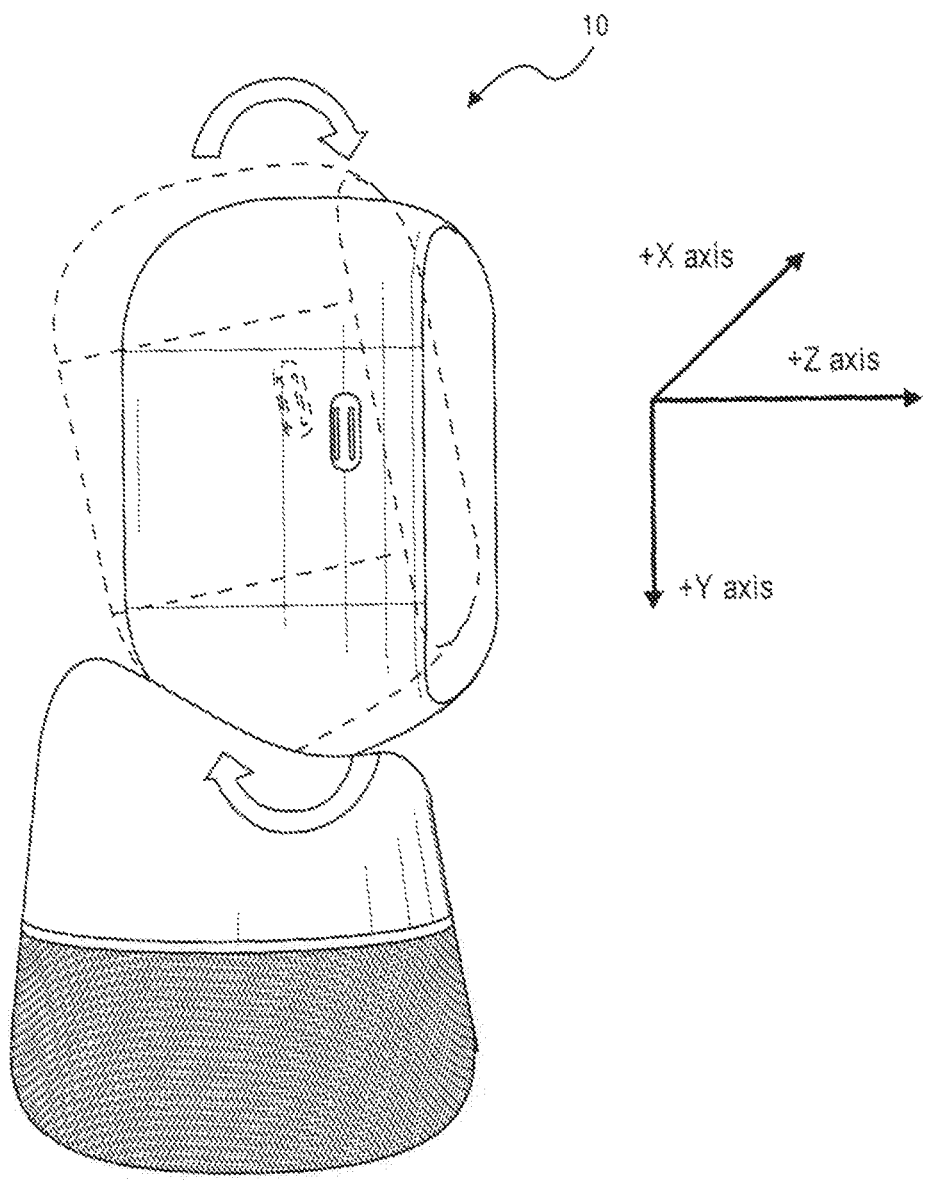

FIG. 9A and FIG. 9B illustrate a rotation range of the interactive device 10 in accordance with another embodiment. In the embodiment of FIG. 9A, the head 11 is configured to rotate about a z-axis with a total of 50 degrees of movement (+25 degrees to −25 degrees). In the embodiment of FIG. 9B, the head 11 is able to rotate about the x-axis as though the head 11 is tilting back and forth.

Figure 10:
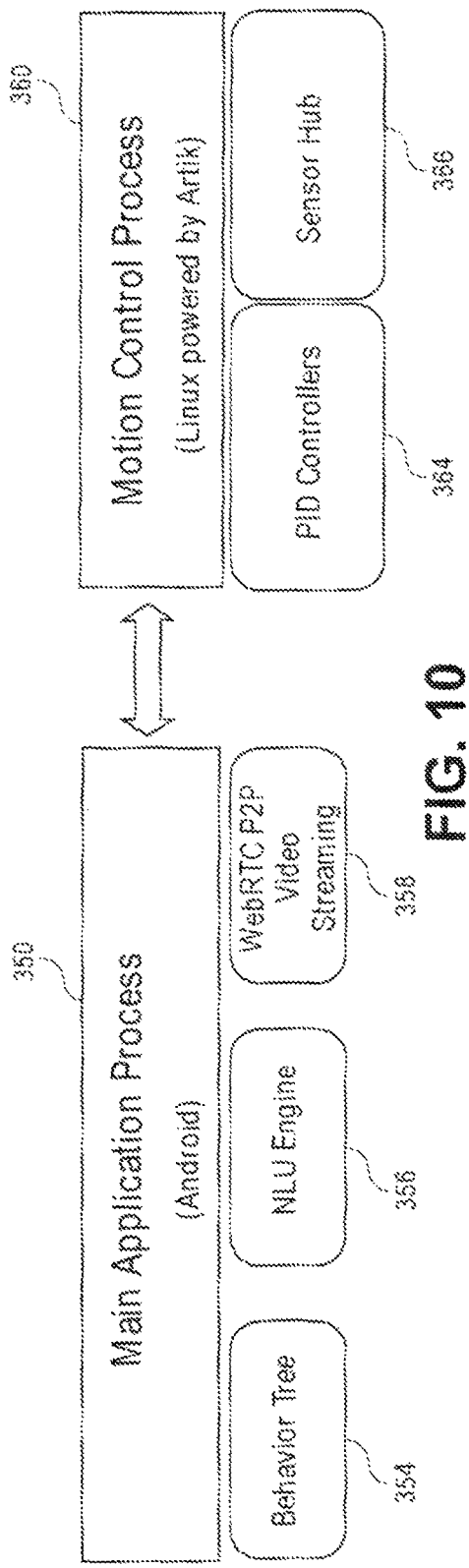
FIG. 10 depicts an exemplary block diagram of the system architecture according to one embodiment.

FIG. 10 depicts an exemplary block diagram of the system architecture in accordance with one embodiment. The system includes a main application process module 350 that communicates with a motion control process module 360. The main application process 350 includes a behavior tree module 354, a natural language understanding (NLU) engine 356, and a web real-time communications (webRTC) peer-to-peer (P2P) video streaming module 358. The behavior tree module 354 manages and coordinates all motor commands to create a desired display and a desired motor animation. The NLU engine 356 processes speech input that includes performing signal enhancement, speech recognition, NLU, service integration, and text-to-speech (TTS) response. The webRTC P2P video streaming module 358 manages the video stream from the interactive device to various sources and companion applications.

The motion control process module 360 includes a proportional-integral-derivative (PID) controller 364 and a sensor hub 366. The PID controller controls a plurality of motors (e.g., 4 motors) precisely using a feedback loop and uses analog positional encoders to accurately track motion. The sensor hub 366 provides sound source localization using energy estimation, and may be used to send other sensor events to the main application process module 350.

Figure 11:
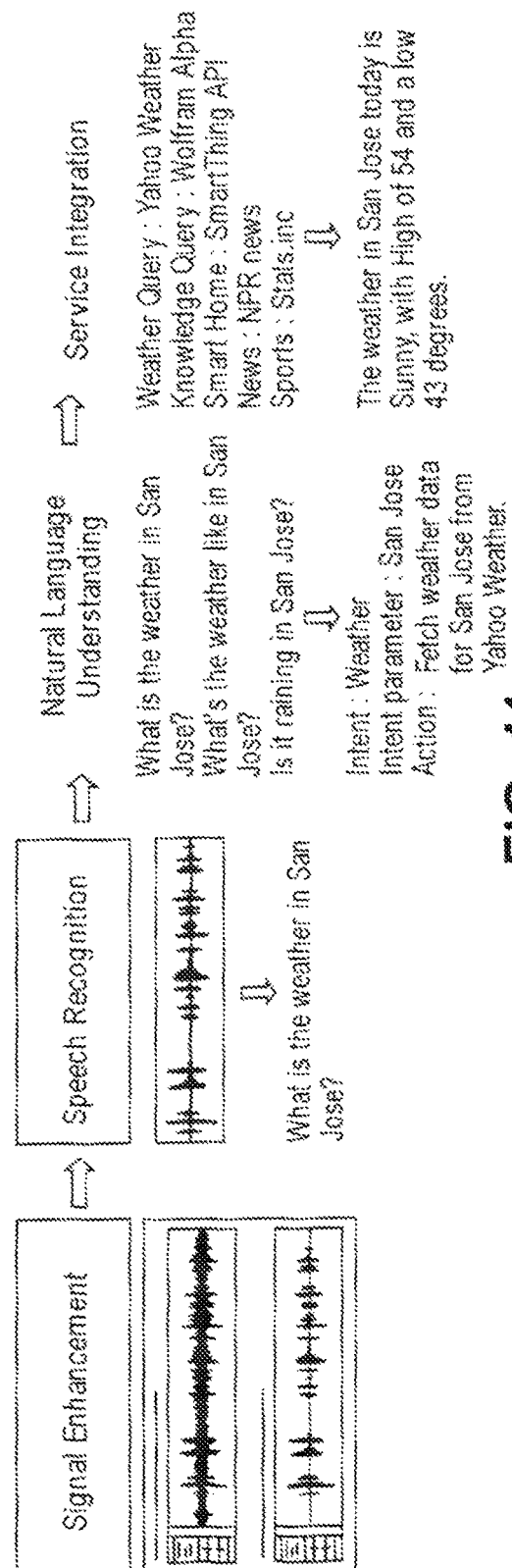
FIG. 11 depicts an exemplary block diagram of NLU engine architecture according to one embodiment.

FIG. 11 depicts an exemplary block diagram of a NLU engine 356 architecture in accordance with one embodiment. The NLU engine 356 may provide signal enhancement by enhancing the accuracy and enabled far-field voice recognition. The NLU engine 356 uses multiple microphone arrays to perform beam forming to identify the sound source, then uses the direction information of the sound source to cancel out noise from other directions. This function improves overall speech recognition accuracy.

The NLU engine 356 may further provide speech recognition by converting the enhanced speech signal into text based on a well-defined corpus of training data to identify the right word and sentence compositions. The NLU engine 356 may further provide NLU to map the recognized text to perform a desired action using NLU tools. The NLU tools can map different phrases and language constructs that imply the same intent to a desired action. For example, the NLU engine 356 receives a voice message from a user, "What is the weather in San Jose?" The NLU engine 356 provides NLU to the voice message to derive an intent "weather," and intent parameter "San Jose," and performs a desired action to fetch weather data for San Jose, e.g. from YAHOO™ Weather.

Once the NLU engine 356 identifies the desired action based on the type of action, the system fetches data from different service/content providers. For example, the NLU engine 356 provides service integration with a plurality of content providers such as a weather query from YAHOO Weather, a knowledge query from WOLFRAMALPHA®, a smart home query from SMARTTHINGS™ API, a news query from NPR™ news, and a sports query from STATS™. The present system formats the data so that a TTS engine uses the data to output a reply to the user via a speaker with a natural tone and speed. For example, the present system formats a data reply, "The weather in San Jose today is Sunny, with High of 54 and a Low of 43 degrees" to output the data reply as an audio message via the speaker.

Figure 12:
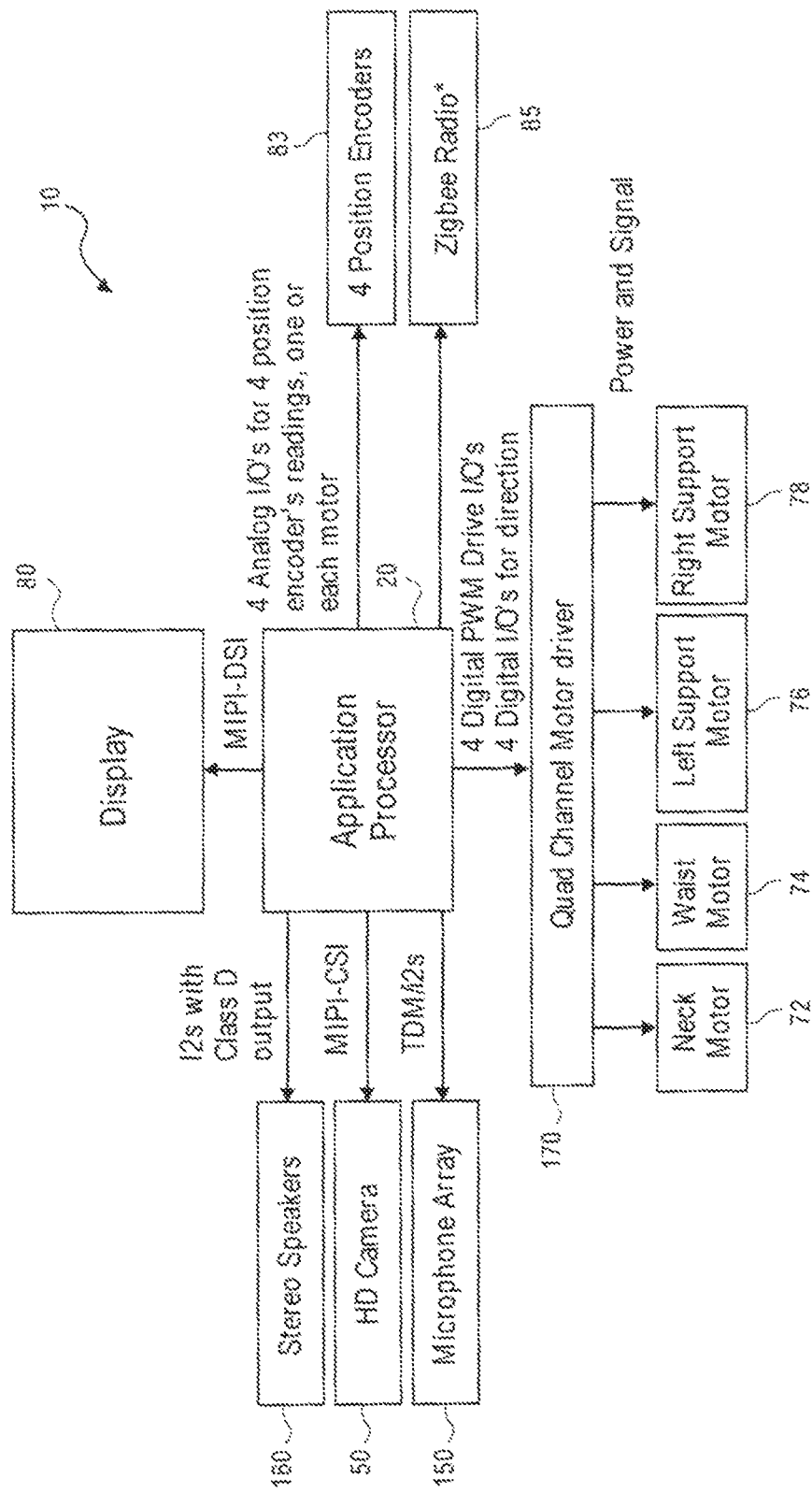
FIG. 12 depicts an exemplary block diagram of hardware architecture of the device according to one embodiment.

FIG. 12 depicts an exemplary block diagram of hardware architecture of the device 10 in accordance with one embodiment. FIG. 12 is a more specific embodiment of what is depicted in FIG. 1, and shows the application processor 20 as being in communication with the internal projection screen 80, the sensor 50 (which is an HD camera in this embodiment), a microphone 150 (which is part of a microphone array in this embodiment), and speakers 160. For the embodiment of FIG. 12, the processor 20 also communicates with a quad channel motor driver 170, which in turn controls a neck motor 72, a waist motor 74, a left support motor 76, and a right support motor 78. The processor 20 may also communicate with encoders 83 and a Zigbee radio 85.

Figure 13:
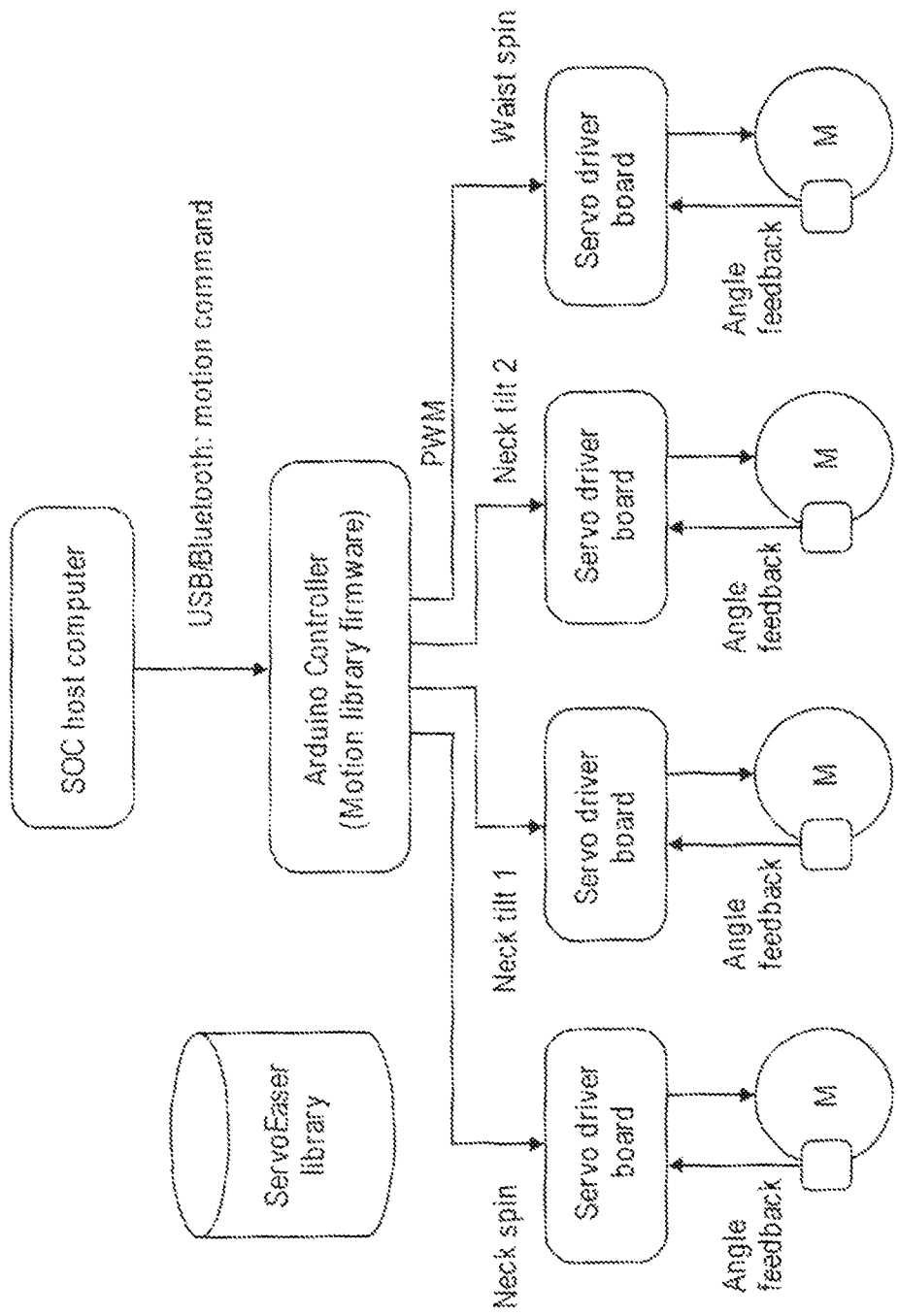
FIG. 13 depicts an exemplary block diagram of robotic architecture of the present device according to one embodiment.

FIG. 13 depicts an exemplary block diagram of robotic architecture of the present device in accordance with one embodiment. As shown, the SOC host computer communicates with the controller to move different parts of the device 10. A ServoEaser library may be used to smooth motor movements by giving acceleration effect.

Figure 14:
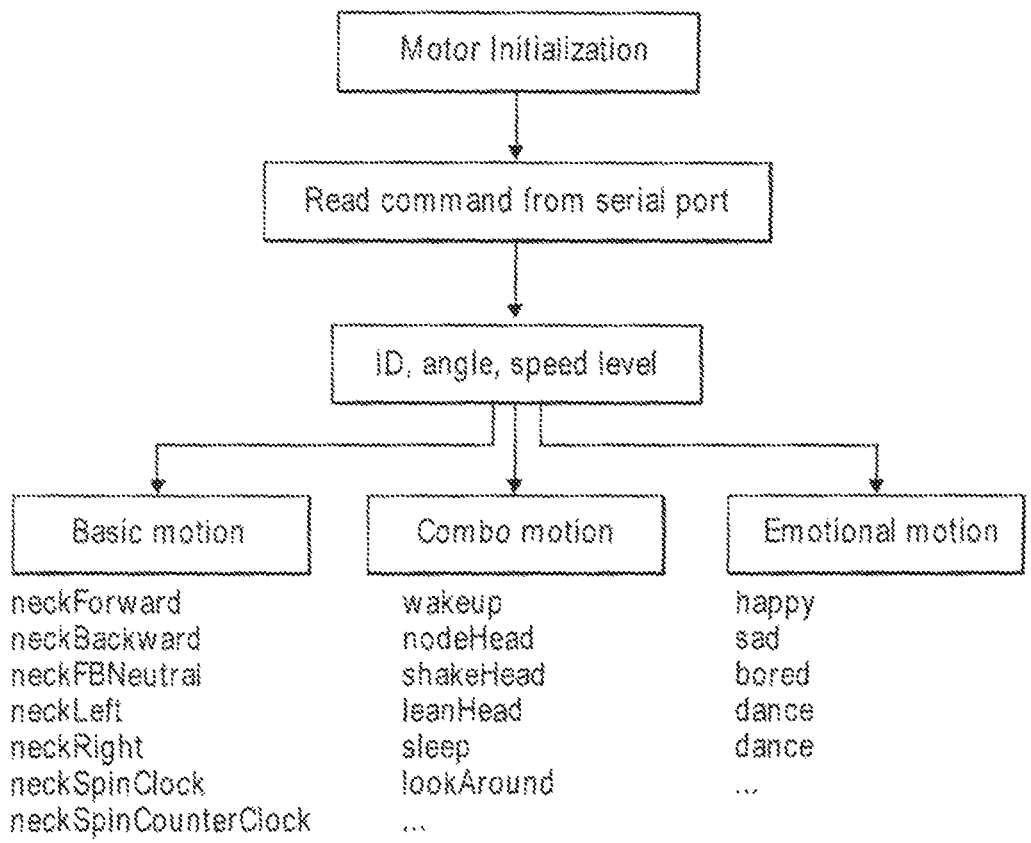
FIG. 14 depicts an exemplary flow chart of performing a desired motion by the device according to one embodiment.

FIG. 14 depicts an exemplary flow chart of performing a desired motion by the device 10, in accordance with one embodiment. The device 10 includes a plurality of motion command application interfaces (APIs) to perform a respective desired action. For example, a motion command "B1, 30.2, 3" means the interactive device 10 performs a "neck-Forward" function to 30.2 degrees (relative angle) with a speed level of 3. In another example, a motion command "E1" means the interactive device performs a "happy1" function. FIG. 15 depicts an exemplary code sample for motion API.

Figure 16:
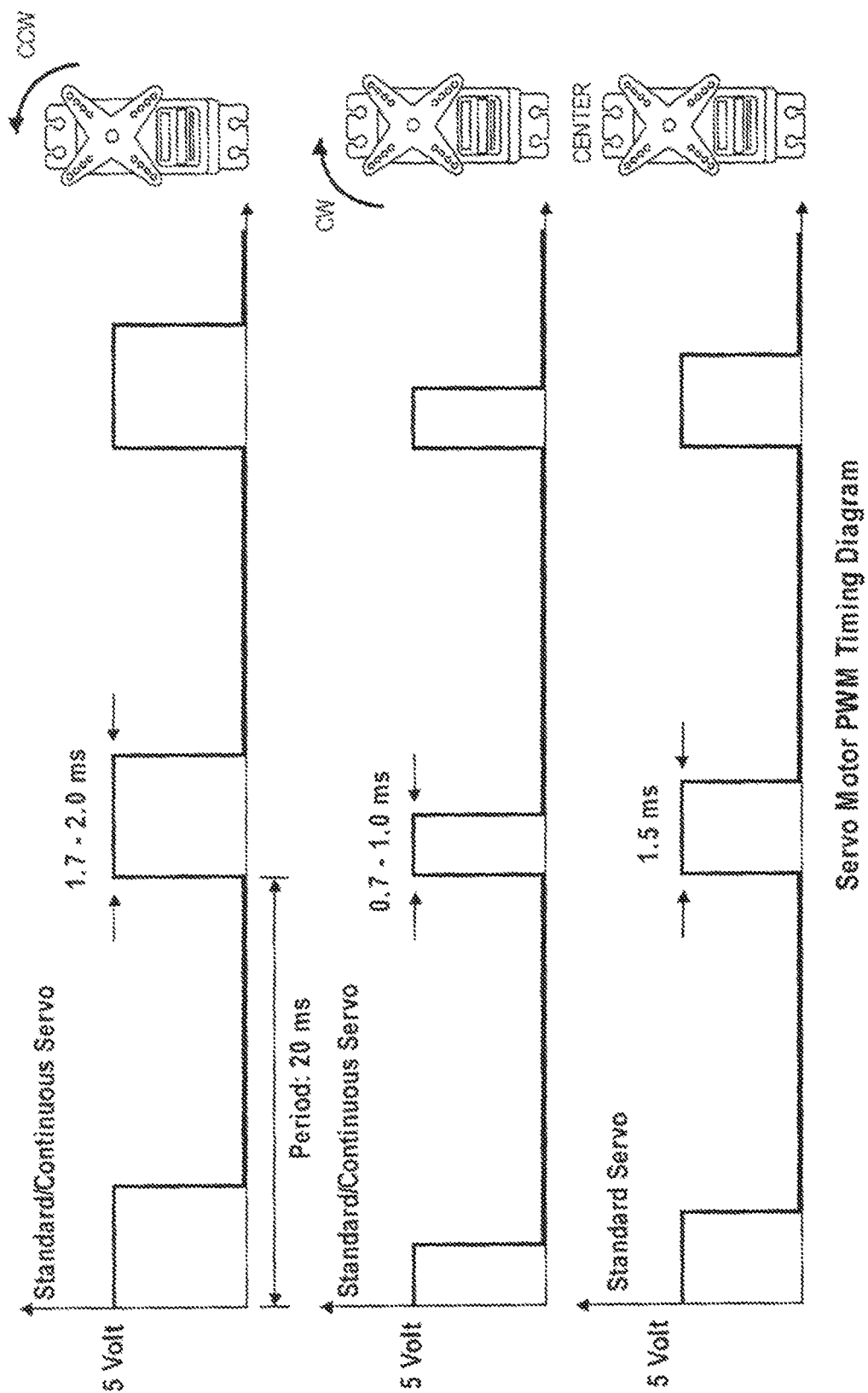
FIG. 16 depicts an exemplary timing diagram for servo motor pulse width modulation (PWM) according to one embodiment.

FIG. 16 depicts an exemplary timing diagram for servo motor pulse width modulation (PWM) in accordance with one embodiment. The servo driver board has PID control to stabilize motor rotation. The real time angle values are selected using a potentiometer.

Figure 17:
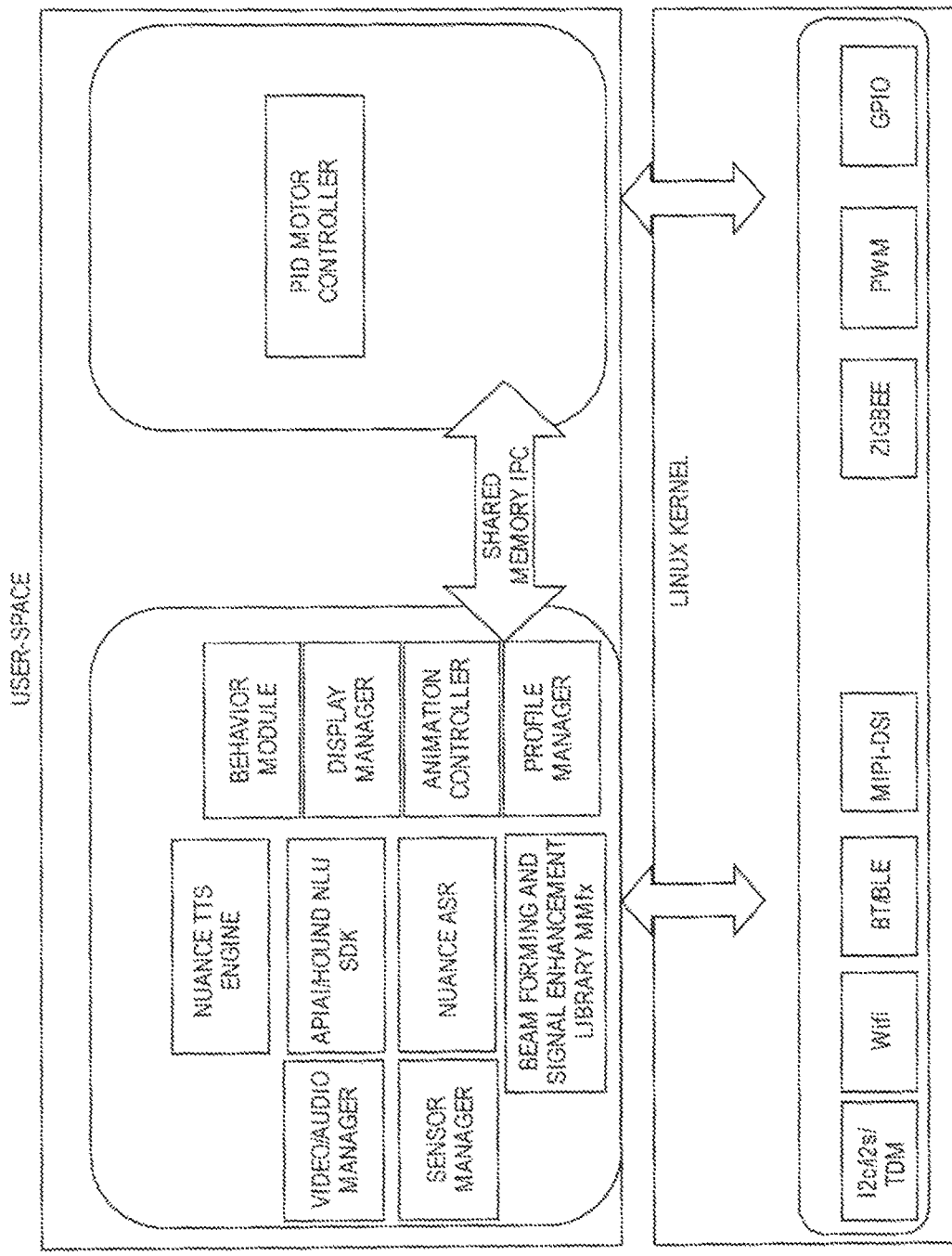
FIG. 17 depicts an exemplary block diagram of the present system according to one embodiment.

FIG. 17 depicts an exemplary block diagram of the present system in accordance with one embodiment. In this embodiment, the device 10 provide security by monitoring users and activity within a boundary area (e.g., within a home), provides a connectivity to other devices and appliances, and provides direct interfacing for queries and tasks. For example, let's suppose the present interactive device 10 receives a voice input from a user to pre-heat an oven to 180 degrees. The interactive device 10 communicates with the oven device to turn on the oven at 180 degrees setting and further provides the user with an audio reply to confirm that the oven has been set to 180 degrees. The device 10 may further receive an acknowledgement message from the oven that that oven has reached 180 degrees so the interactive device 10 can send a second audio reply to the user to notify him that the oven has reached 180 degrees.

Figure 18:
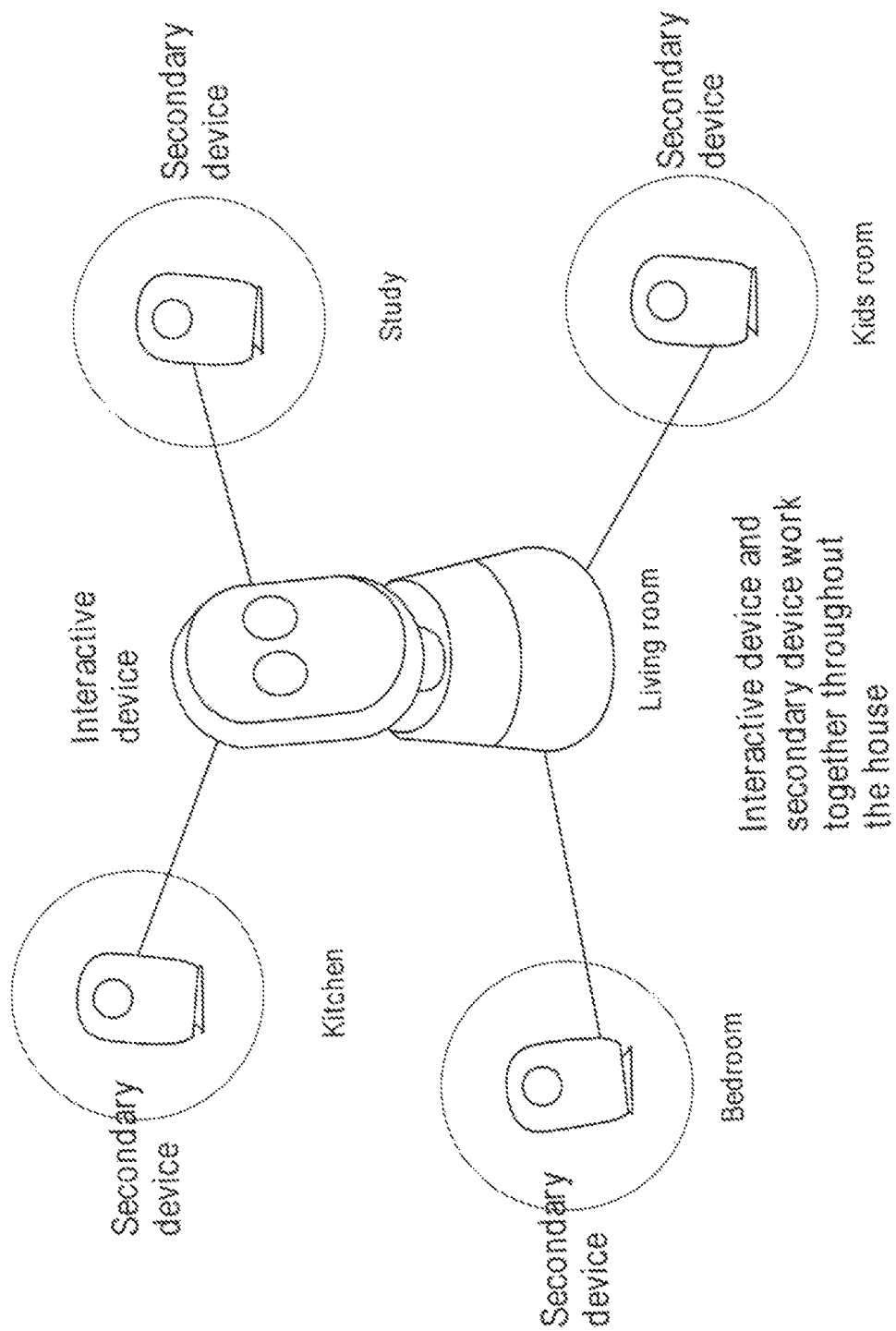
FIG. 18 depicts an exemplary diagram of connecting the device to multiple secondary devices according to one embodiment.

According to one embodiment, the device 10 is further connected to one or more secondary devices to receive or provide information to the secondary device. FIG. 18 depicts an exemplary diagram of connecting the present device 10 to multiple secondary devices in accordance with one embodiment. The device 10 may be wirelessly connected to each secondary device via a Wi-Fi connection or a Bluetooth connection. The secondary device includes a video camera, a microphone array, and a speaker. For example, a video camera of the secondary device captures and detects a broken window. The secondary device sends the image of the broken window to the present device 10 that may further transmit the image to the user's mobile device.

According to another embodiment, the device 10 provides feedback in response to a voice input by a user to establish that it is engaged for human voice interaction. The feedback includes one or more visual feedback, audio feedback, and movement feedback. For example, when a user provides a trigger voice command such as "Hello," the device 10 may tilt its head shell 13 to one side to simulate listening, display wide open eyes on a UI on the head shell as a listening facial expression, and provide a voice feedback. The movement feedback may include raising the head shell and turning the head shell 13 in the direction of the sound source. According to one embodiment, the device 10 includes a 4-degree of freedom (DOF) mechanical structure design.

As mentioned above, according to another embodiment, the sensor 30 (e.g., the camera) in the device 10 detects that a user is coming closer. The device 10 allows the sensor 30 to further locate the eye of the user and estimate the visual attention of the user. If the device 10 determines that the user has sufficient visual contact, the device 10 triggers the voice input engine and waits for a voice command from the user. According to one embodiment, the device 10 includes a sensor 30 and a microphone array 50 to detect a particular user.

According to yet another embodiment, the device 10 receives a natural gesture input and provides a feedback to the gesture input. Table 1 illustrates various gestures and their associated meaning, and the corresponding feedback from the device 10.

TABLE 1

| Gesture | Meaning | Reaction from Device 10 |
| --- | --- | --- |
| Index finger of one hand is extended and placed vertically in front of lips, with the remaining fingers curled toward the palm with the thumb forming a fist | Request for silence | Mutes, or stops moving |
| Connect thumb and forefinger in a circle and hold other fingers up straight | Okay | Accepts user commands or executes instructions |

TABLE 1-continued

| Gesture | Meaning | Reaction from Device 10 |
|---|---|---|
| Index finger sticking out of the clenched fist, palm facing the gesturer. The finger moves repeated towards the gesturer (in a hook) as though to draw something nearer | Beckoning | Turns to focus on action issuer from others |
| Natural number one through ten | Number gestures | Inputs number or number-related commands |
| Raise one hand and then slap hands together | High five | Greeting, congratulations or celebration |
| Draw circle and triangle | Alarm state | Communicates with emergency provider |

According to one embodiment, the device 10 provides multi-user behavior and pattern recognition. The device 10 understands group behavior and individual preferences of each user based on interaction with each user. The device 10 provides a heuristic method to automatically learn by logging the time of day of interaction, duration of interaction, and a user identifier to determine the user's intrinsic pattern. The device 10 may further analyze group interactions between multiple users using a camera, to understand group structure and hierarchy. For example, the device 10 may classify a group of users sitting at a table as a family having dinner, which is then correlated with other logs such as a time of day and the number of people detected. This allows the device 10 to determine an average time of day that the family has dinner so that the device can provide information and services such as nutrition information, take-out service, recipes, etc.

In another embodiment, the device 10 determines that a user has interest in sports based on various factors such as detecting a type of sportswear on the user, and a frequency of voice input from the user associated with a particular sport. The device 10 may then provide sports information to the user, such as special events or calendar events.

According to one embodiment, the device 10 receives haptic and tactile interactions from a user to adjust a behavior, add a feature, control, and convey a message. For example, a user taps the head shell 13 of the device 13 to convey happiness or satisfaction. The device 10 detects the tap on the head shell 13 and changes its movement, animation, and its vocal response to the interaction. According to one embodiment, the device 10 provides emotion detection using voice, images, and sound to identify a user's emotional state. The device 10 may provide a behavior change based on a detected type of music. For example, the speaker of the device 10 provides a surfer-like voice when surf rock music is playing, ant he UI of the present interactive device displays animations associated with the surf rock genre.

According to one embodiment, the device 10 synchronizes expression, movements, and output responses for multimodal interaction. The device 10 provides various techniques to ensure that each modality of output is synchronized to create the proper effect needed to create a natural interaction with the user. The techniques include buffered query response and preemptive motion cues. The device 10 synchronizes and coordinates functions of all the output modalities so that the final actuation is as natural as possible. For example, if the TTS engine's response from the server is slow, the device 10 includes a controller mechanism that automatically determines that time is required and starts an idle animation on the UI and a synchronized movement that shows a natural waiting behavior.

According to one embodiment, the device 10 provides automatic security profile creation and notification. The device 10 includes a high definition camera, a microphone array, actuators, and speakers to automatically determine and learn the security status of a location based on past history and trigger words. For example, the device 10 can learn that a desired word (e.g., help, danger) or loud noises (e.g., a sound above a predefined decibel limit) are indicators for investigation, and switches into a tracking mode. This allows the device 10 to track the source of the sound/behavior and monitor the source. The device 10 may further analyze the voice signature to detect stress or mood.

The device 10 further includes a computing module to provide accurate and precise coordination between the computing module and the actuators. The camera and microphone in conjunction with the computing module identifies a position, direction, and a video stream of the area of interest and synchronizes with the actuating motors to keep track of the area of interest. The device 10 dynamically determines a point of interest to track, where the point of interest may be a sound or a specific action in the camera feed. According to one embodiment, the device 10 dynamically selects a desired modality of sensing. For example, the camera of the device 10 captures a dog barking since the dog is producing a loud uncommon noise and an unusual person moving through the home quietly. Although they are both analogous behavior, the device 10 dynamically determines that the camera tracks the unusual person rather than the sound emanating from the barking.

According to one embodiment, the device 10 provides machine-learning based sound source separation and characterization using an actuated microphone array. Sound source separation and acoustic scene analysis involves being able to distinguish different sound sources within a particular acoustic environment. The device 10 uses the microphone array that can be actuated based on a combination of beam forming and blind source separation techniques to identify the approximate location of different sound sources and then determine their general category type based on the supervised machine-learning model.

The actuated microphone array allows the device 10 to create a dynamic acoustic model of the environment. The device 10 updates the acoustic model and feeds data from the acoustic model into a blind source separation model that determines and learns different sound sources within the environment after a period of time. For example, the device 10 detects that there is a consistent buzz everyday at a specific time of the day. The device 10 has a trained model having common acoustic signals for common household noises (e.g., a sound of a blender running). The device 10 uses the trained model to determine and identify that the consistent buzz is potentially the sound of a blender. The device 10 can use the identified blender sound to create an acoustic map of the surrounding environment. The device 10 can associate the identified blender sound with a kitchen location. Thus, the device 10 can determine a geographical location of the kitchen based on the direction of the blender sound (using beam forming and localizing the blender sound). The device 10 may further analyze other sound sources within the surrounding environment to infer other sound sources and their respective locations; for example, a TV is associated with a living room and an air vent is associated with a ceiling. This allows better noise canceling and acoustic echo cancellation, and further enables the device 10 to create a model of the surrounding environment to facilitate other tasks carried out by the device 10.

In one embodiment, the device 10 detects a blender sound and does not identify the blender sound, the device 10 prompts the user to respond and identify the blender sound. The user may respond with a voice input that identifies the sound, for example "a blender." The device 10 receives the voice input, identifies the voice input as "blender" word, associates word with the blender sound, and stores this association.

According to one embodiment, the device 10 provides automatic kinematic movement and behavior creation based on manipulation of the device 10 by a user. This allows the device 10 to create a new actuated motion or a behavior. The user may begin the creation of a new motion behavior by setting the device 10 to a learning mode. Once the learning mode is initiated, the user moves an actuated part of the device 10 to a desired location at a desired speed (as if controlling the device 10 by hand, this may be either a single pose or a combination of different poses to create a behavior sequences). The user assigns a name to the behavior and identifies one or more key frames. The device 10 registers the behavior, and can execute the motion or poses associated with the behavior automatically.

According to one embodiment, the device 10 further provides inferred pose estimation of the robot based on a visual cue. A user may provide the device 10 with a movement/behavior by articulating a movement with a similar degree of freedom as the device 10. The device 10 captures the movement with an inbuilt camera, analyzes the captured movement, automatically infers the movement, and determines a method of achieving the movement using its actuation mechanism. For example, the device 10 captures a video feed of a pose performed by a user. The device 10 analyzes the video feed of the pose, and determines the specific poses, angle, and speed at which the actuating motors need to be triggered to create a closest approximation of the pose. According to one embodiment, the device 10 learns language based on voice, face, and lip recognition.

The present disclosure may be embodied in many different forms and should not be construed as being limited to the embodiments set forth herein. In this disclosure, example embodiments are described in detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present disclosure.

The electronic devices or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some portions of the above descriptions are presented in terms of algorithms and/or symbolic representations of operations on data bits that may occur within a computer/server memory. These descriptions and representations are used by those skilled in the art of data compression to convey ideas, structures, and methodologies to others skilled in the art. An algorithm is a self-consistent sequence for achieving a desired result and requiring physical manipulations of physical quantities, which may take the form of electro-magnetic signals capable of being stored, transferred, combined, compared, replicated, reproduced, and otherwise manipulated. Such signals may be referred to as bits, values, elements, symbols, characters, terms, numbers, or the like. These and similar terms are associated with appropriate physical quantities, and are used as representative labels for these quantities. Accordingly, terms such as "processing," "computing," "calculating," "determining," "displaying" or the like, refer to the action and processes of a computing device or system that manipulates data represented as physical quantities within registers/memories into other data that is also represented by stored/transmitted/displayed physical quantities.

While the embodiments are described in terms of a method or technique, it should be understood that aspects of the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the system and method disclosed herein. Such apparatus may include circuits, dedicated and/or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

What is claimed is:

1. A device comprising:
   a shell having an internal projection screen and an opening;
   a projector emitting a projection beam from inside the shell;
   an optical guide inside the shell, the optical guide adjustably aiming the projection beam in one of a first direction and a second direction, the first direction being toward the internal projection screen and away from the opening, and the second direction being toward the opening;
   a sensor determining a distance between a user and the internal projection screen and continuously monitoring an amount of ambient light around the device, wherein monitoring an amount of ambient light involves comparing the amount of ambient light with a threshold scope;
   a processor coupled to the sensor and in communication with the optical guide, the processor selecting a direction in which the projection beam is aimed based on the distance; and
   a moving mechanism coupled to the optical guide, wherein the moving mechanism adjusts the position of the projector according to the direction that is selected by the processor, and wherein the processor selects the direction based on a type of visual content and the amount of ambient light around the device.

2. The device of claim 1, wherein the sensor comprises a camera.

3. The device of claim 1, wherein the processor dynamically adjusts the position of the projector based on the distance.

4. The device of claim 3, wherein the projector aims the projection beam at the internal projection screen if the distance satisfies a threshold range, and wherein the projector aims the projection beam through the opening if the distance does not satisfy the threshold range.

5. The device of claim 1, wherein the selected direction is at the internal projection screen if the amount of ambient light satisfies the threshold scope, and wherein the selected direction is at the opening if the amount of ambient light does not satisfy the threshold scope.

6. The device of claim 1, further comprising a distance measurement unit configured to measure a length between the projector and a projection surface if the projection beam is aimed at the opening, such that the processor automatically sets a focal length according to the length.

7. The device of claim 1, wherein the optical guide comprises a rotatable mirror.

8. The device of claim 1, wherein the opening comprises a transparent window.

9. A method, comprising:
   emitting, by a projector, a projection beam from inside a shell of an electronic device;
   determining, by using a sensor, a distance between a user and an internal projection screen that is part of the shell, and an amount of ambient light around the electronic device;
   selecting, by the processor, a direction in which the projection beam is aimed based on a type of visual content and whether the amount of ambient light around the electronic device satisfies a threshold scope; and
   adjusting, by an optical guide inside the shell and based on the distance, the direction of the projection beam such that the projection beam is aimed either at the internal projection screen from inside the shell or at an opening in the shell.

10. The method of claim 9, further comprising dynamically adjusting, by the processor, the position of the projector based on the distance.

11. The method of claim 10, further comprising aiming, by the projector, the projection beam at the internal projection screen if the distance is outside a threshold range, and through the opening if the distance is within the threshold range.

12. The method of claim 9, further comprising aiming, by the projector, the projection beam at the internal projection screen if the amount of ambient light satisfies the threshold scope; and aiming, by the projector, the projection beam at the internal projection screen if the amount of ambient light does not satisfy the threshold scope.

13. The method of claim 9, further comprising:
   measuring a range between the projector and a projection surface if the projection beam is aimed through the opening;
   setting, by the processor, automatically a focal length according to the range.

14. A device comprising:
   a shell having an internal projection screen and an opening;
   a projector emitting a projection beam from inside the shell;
   an optical guide inside the shell, the optical guide adjustably aiming the projection beam in one of a first direction and a second direction, the first direction being toward the internal projection screen and away from the opening, and the second direction being toward the opening;
   a sensor determining a distance between a user and the internal projection screen;
   a processor coupled to the sensor and in communication with the optical guide, the processor selecting a direction in which the projection beam is aimed based on the distance; and
   a moving mechanism coupled to the optical guide, wherein the moving mechanism adjusts the position of the projector according to the direction that is selected by the processor, and wherein the processor selects the first direction if the distance satisfies a threshold range and a type of visual content is not a movie or a video, the processor selects the second direction if the distance does not satisfy the threshold range and the type of visual content is a movie or a video.

* * * * *